Nov. 15, 1955  B. ROEBUCK  2,723,819
FOOD CUTTER CONSTRUCTION
Filed June 14, 1952
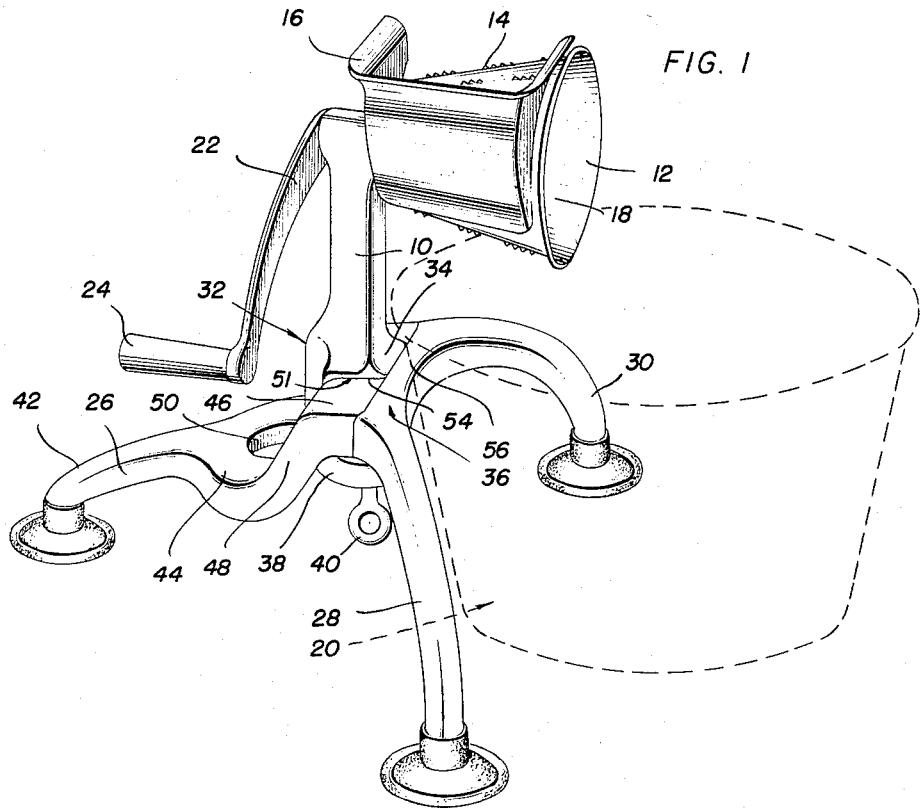
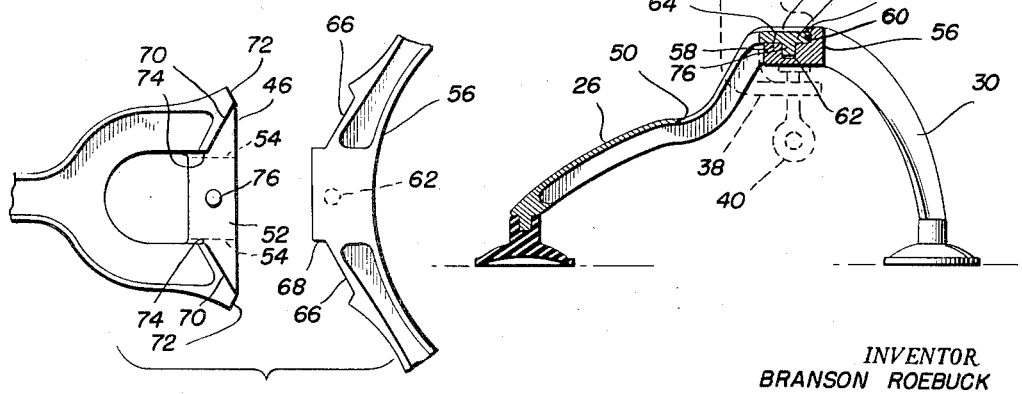
INVENTOR
BRANSON ROEBUCK
BY
Lockwood, Galt, Wardard & Smith
ATTORNEYS United States Patent Office 2,723,819
Patented Nov. 15, 1955

2,723,819

FOOD CUTTER CONSTRUCTION

Branson Roebuck, Fort Wayne, Ind.

Application June 14, 1952, Serial No. 293,550

10 Claims. (Cl. 248—165)

The present invention relates to a food cutter construction, and more particularly to a supporting structure for conveniently positioning a food cutter on a working surface such as the top of a cabinet or table.

A principal object of this invention is to provide a food cutter construction which is easily assembled and disassembled for facilitating the storage and cleaning of the parts thereof.

Another object of this invention is to provide a supporting structure for a food cutter which will stably support a food cutter of the hand crank variety during the operation thereof.

Another object of this invention is to provide a disassemblable supporting structure for a food cutter which, when assembled, may be carried about as a single unit, and which is inherently rigid to withstand heavy duty use.

Still another object of this invention is to provide a disassemblable food cutter construction which is comprised of essentially only three separate parts which may be assembled in one method only thereby making the assembly act the ultimate in simplicity and reliability.

Still yet another object of this invention is to provide a food cutter construction of the hand operated crank type, which may be efficiently and easily manipulated without interference from any of the structure parts.

In connection with the last stated object, similar food cutter constructions cannot be operated with ease, because a part of the construction obstructs the free turning movement of the crank arm. In the use of these prior art constructions, the knuckles of the operator's hand are often skinned or otherwise injured by striking the interfering parts of the structure as the crank is rotated.

In addition to the objects stated in the foregoing, other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

Fig. 1 is a perspective illustration of an embodiment of the present invention;

Fig. 2 is a bottom view of a part of the structure of Fig 2, shown ready for assembly; and Fig. 3 is a transverse section of the structure of Fig. 1.

Referring to the drawings, and more particularly to Fig. 1, an upright support or column 10 carries for rotation at its upper end a frusto-conically shaped cutting head 12 having a plurality of suitably shaped knives or cutting edges 14 on its outer periphery. A food-receiving hopper 16 is rigidly secured to the upper end of column 10 and is positioned adjacent the cutting edges 14 in such a manner that rotation of the head 12 will result in the food contained in the hopper being chopped or cut into suitably sized pieces and ejected from the head at 18 into a bowl or the like 20. A crank arm 22 having a handle 24 is also supported by the column 10, and is secured to head 12 in any suitable manner for rotating the latter.

The column 10 and the associated cutting mechanism is supported by a tripod stand having legs 26, 28 and 30. Preferably, these legs are angularly spaced apart approximately one hundred and twenty (120) degrees to facilitate the operation of the cutter, which will be explained more fully hereafter.

A C-clamp, generally indicated by the reference numeral 32, is provided in the lower end of column 10 for attaching the cutting mechanism to the tripod stand, the upper jaw 34 of this clamp formed to engage the upper platform stand surface 36, while the lower jaw 38 is equipped with a thumb-screw 40 for engagement with the underside of the platform.

As is clearly shown in the drawings, the three legs 26, 28, and 30 are suitably converged upwardly and inwardly to merge into the aforementioned platform section 36. This stand is made in only two parts, viz. the single leg 26, and the two legs 28 and 30 formed integrally with each other. These two stand parts are joined together by means of an interlocking arrangement which constitutes the platform 36, this arrangement being such as to enable easy assembly and disassembly of the stand as desired. As seen in Fig. 2, when disassembled, the two parts of the stand may be easily cleaned and stored in a minimum of space.

The stand leg or section 26 is formed with a lower extension 42 which merges at its upper portion with a substantially level intermediate step 44 which is joined with an upper cross member 46 by means of an interconnecting upright section 48. The intermediate sections 44 and 48 have a substantial lateral dimension which accommodates a fairly large opening 50 which extends from the step 44 up to the cross bar 46. As will be seen more clearly in Fig. 1, this opening 50 receives the clamp 32 of the support column 10 for attachment of the clamp to the stand as explained previously. A saddle 51 consisting of a downwardly offset horizontal surface 52 having spaced upright sides 54, is provided in the upper surface of platform portion 36 and is formed in the cross bar 46 of the leg 26. The shape of this saddle 51 is made to snugly receive the complementary portion of jaw 34 of the clamp 32, the fit of the jaw with the saddle being such as to hold the column 10 rigidly against pivotal movement about its longitudinal axis. In the assembly of this invention, all that is required of the operator is that he properly position the jaw 34 in the saddle 51, and then run the thumb-screw inwardly until the jaw 32 is firmly clamped to the stand. It is thus seen, by means of this particular construction, the opening 50, the intermediate leg portions 44 and 48, the saddle 51, and the jaw 34 all co-operate to make the assembly of this invention easy and absolutely fool proof.

As stated previously, the two parts or sections comprising the stand have an interlocking fit for the convenient assembly and dis-assembly thereof. The arrangement of this interlock is more clearly seen in Figs. 2 and 3, the platform portion 36 being shown as being actually comprised of two parts, namely, cross bar 46 of the leg 26, and a connecting frame piece 56 which integrally joins the upper ends of legs 28 and 30.

This frame piece 56 is formed with a downwardly offset and horizontally disposed ledge 58 which is joined with the upper surface of the platform 36 by means of the straight vertical shoulder 60. A socket 62 is provided in the upper surface 64 of ledge 58 for a purpose which will be explained hereafter. As seen in Fig. 3, the ledge 58 tapers generally in the direction of the leg 26, this taper being constituted by the vertical shoulders 66 which merge into a straight rectangular section 68 having a length suitable for a purpose to be explained hereafter.

The other part of the interlock is carried by the leg 26, and as more clearly seen in Figs. 2 and 3, is comprised of depending abutment lugs 70 provided on the underside of the cross member 46. These lugs are affixed to the opposite corners 72 of the cross member 46 to incline inwardly in exact conformity with the tapered surfaces 66 described previously. The distance between the ends 74 of these lugs 70, is made substantially coextensive with the dimension of the frame piece projection 68, so that this projection 68 may be snugly received therebetween.

In assembling the two stand sections, as illustrated in Fig. 3, the projection 68 is inserted between the lugs 70 so as to bring the lower surface of the cross bar 46 into engagement with the ledge surface 64 and a nib 76, provided on the under surface of the cross member 46, is received by the socket 62.

Now, when the two parts are assembled in this manner, it will be seen that the lugs 70 will conformingly engage the tapered surfaces 66 thereby restricting, positively, lateral displacement of the two stand sections with respect to each other, as well as relative displacement in a plane which generally includes the leg 26 and which transversely intersects an imaginary line joining the feet of legs 28 and 30. The projection 68 also serves to locate positively in position the two stand parts relative to each other, and further serves to insure that the nib and socket 76, 62 properly mate to insure firm locking inter-engagement of all of the various parts.

With these stand sections so interlocked together and placed upon a level surface as indicated in Fig. 1, the stand will support a relatively large weight placed upon the platform portion 36. This weight will tend to more firmly interlock the stand parts together.

With the stand sections assembled, as illustrated in Fig. 3, the clamp 32 with the thumb-screw 40 sufficiently loosened is inserted through the opening 50 in leg 26 in such a manner that the jaws 34 and 38 will embrace both the cross bar 46 and the frame piece ledge 58. Now by turning the thumb-screw 40 inwardly, the two stand sections will be firmly clamped together.

As will be seen in Fig. 1, among the attributes of the construction of this invention is the fact that the handle 24 may be operated without any interference from any part of the construction. This is true since the intermediate portion 44 of leg 26 is leveled off and joined with the upper platform portion 36 by means of the offset vertical section 48. Thus, when the handle 24 is rotated ample clearance is provided between the handle and the leg 26 for the operator's hand to pass without interference.

Coupled with this easy operation without fear of injury to the operator, the stand and cutter may be easily assembled and disassembled by even the most unskilled person, and the assembly act can follow only one plan. In following this plan, it is absolutely assured that the cutter head 12 will extend outwardly and above the space between the two legs 28 and 30 which are angularly spaced apart to receive a bowl or the like 20.

In operating the cutter, it is of course well known that occasionally considerable effort must be exerted upon the handle 24 in order to cut certain foods, and when this occurs, this force must be withstood by the various cutter parts. Since the plane of rotation of the crank 22 is substantially parallel to an imaginary line connecting the feet of the legs 28 and 30, the force exerted on the handle 24 will be proportionately distributed to not less than two of the stand legs at any instant. In other words, during the operation of the crank 24 at no time will the total downward component of force be taken by only one leg. Such distribution of forces is assured in all occasions of assembly of the present invention, since the cutter stand parts can fit together in only one arrangement.

In summarizing, the present invention lends itself to easy assembly and disassembly by even the most unskilled person; is stable in its operation; is completely rigid in its construction; is fool proof in its assembly; and is easily operated without interference from any of the structural parts.

What is claimed is:

1. A food cutting device comprising an upright supporting column, a crank rotatably mounted on the upper portion of said column, a U-clamp provided on the lower portion of said column, a thumb-screw adjustably mounted on said clamp for rigidly mounting said column on a stationary support, a stationary support having three angularly spaced legs which converge into a platform portion, one leg of the support being removably attached to the other two legs at said platform portion, said one leg comprising a member which inclines generally downwardly away from said platform portion and which is provided with a step portion located lower than said platform portion, said step portion lying in a plane substantially parallel to said platform portion and being provided with an opening which extends from said platform portion to said step portion, said one leg having a cross member which detachably locks onto a ledge provided on the other two legs, said cross member and said ledge forming the aforementioned platform portion and a recessed saddle provided in said cross member, said column being received through said opening whereby said clamp may snugly fit into said saddle to hold said column against rotation about an upright axis and to embrace both said cross member and said ledge for clamping the latter together, said thumb screw being operable to clamp rigidly together said legs and said column whereby said crank can be continuously rotated without interference from any part of said stationary support.

2. A food cutting device comprising an upright supporting column, a crank rotatably mounted on the upper portion of said column, a U-clamp provided on the lower portion of said column, a stationary support having three angularly spaced legs which converge into a platform portion, one leg of the support being removably attached to the other two legs at said platform portion, said one leg comprising a member which inclines generally downwardly away from said platform portion and which is provided with a step portion located lower than said platform portion, said step portion lying in a plane substantially parallel to said platform portion and being provided with an opening which extends from said platform portion to said step portion, said one leg having a cross member which detachably locks onto a ledge provided on the other two legs, said cross member and said ledge forming the aforementioned platform portion and a recessed saddle provided in said cross member, said column being received through said opening whereby said clamp may snugly fit into said saddle to hold said column against rotation about an upright axis and to embrace both said cross member and said ledge for clamping the latter together.

3. A supporting structure comprising three angularly spaced legs which converge into a platform portion, one leg of the support being removably attached to the other two legs at said platform portion, said one leg comprising a member which inclines generally downwardly away from said platform portion and which is provided with a step portion located lower than said platform portion, said step portion lying in a plane substantially parallel to said platform portion and being provided with an opening which extends from said platform portion to said step portion, said one leg having a cross member which detachably locks onto a ledge provided on the other two legs, said cross member and said ledge forming the aforementioned platform portion and a saddle provided in said cross member.

4. A supporting structure comprising three angularly spaced legs which converge into a platform portion, one leg of the support being removably attached to the other two legs at said platform portion, said one leg comprising a member which inclines generally downwardly away from said platform portion and which is provided with a step portion located lower than said platform portion, said step portion lying in a plane substantially parallel to said platform portion and being provided with an opening which extends from said platform portion to said step portion, said platform portion being comprised of two interlocking parts, one of said parts being formed integral with said one leg and the other of said parts being formed integral with the other of said legs, said parts being so arranged that said legs may be joined together to provide a self-supporting rigid structure, and a saddle provided on the upper section of said platform portion.

5. A supporting structure comprising three angularly spaced legs which converge into a platform portion, one leg of the support being removably attached to the other two legs at said platform portion, said one leg comprising a member which inclines generally downwardly away from said platform portion and which is provided with a step portion located lower than said platform portion, said step portion lying in a plane substantially parallel to said platform portion and being provided with an opening which extends from said platform portion to said step portion, said platform portion being comprised of two interlocking parts, one of said parts being formed integral with said one leg and the other of said parts being formed integral with the other of said legs, said parts being so arranged that said legs may be joined together to provide a self-supporting rigid structure.

6. A supporting structure comprising a plurality of angularly spaced legs which incline upwardly and inwardly to merge into a platform portion, one leg of the support being removably attached to the other legs which have an integral connection therebetween, said one leg comprising a member which inclines generally downwardly away from said platform portion and which is provided with a step portion located lower than said platform portion, said step portion lying in a plane substantially parallel to said platform portion and being provided with an opening which extends from said platform portion to said step portion, said platform portion being comprised of two interlocking parts, one of said parts being formed integral with said one leg and the other of said parts being formed integral with the other of said legs, said parts being so arranged that said legs may be joined together to provide a self-supporting rigid structure, and a saddle provided on the upper section of said platform portion.

7. A disassemblable tripod supporting stand comprising three angularly spaced legs which incline upwardly and inwardly to merge into a centrally positioned elevated platform, one of said legs being detachably secured to the other two legs and having a gradually upwardly curved lower portion, a stepped intermediate portion, and a horizontally disposed upper portion which lies in a plane substantially parallel to said stepped portion, said intermediate and upper portions being joined by a substantially vertical section, an opening provided in said vertical section, said upper portion comprising a flat cross member having two spaced lugs depending therefrom, said other two legs having at the juncture thereof a downwardly offset ledge, the upper surface of said ledge being engageable by the lower surface of said cross member, and said lugs being engageable by said ledge to position same relative to said cross member, and a boss provided on the lower surface of said cross member and enterable into a companion recess formed in the upper surface of said ledge, said lugs and said boss and recess serving in combination to detachably interlock said legs together into a rigid unitary structure which may be disassembled by pivoting said one leg about its connection with said other legs inwardly in a direction transverse to an imaginary line connecting the lower extremities of said other legs.

8. A disassemblable tripod supporting stand comprising three angularly spaced legs which incline upwardly and inwardly to merge into a centrally positioned elevated platform, one of said legs being detachably secured to the other two legs and having a gradually upwardly curved lower portion, a stepped intermediate portion, and a horizontally disposed upper portion which lies in a plane substantially parallel to said stepped portion, said intermediate and upper portions being joined by a substantially vertical section, said two legs joining in a ledge portion, and means provided on both said upper and ledge portions for detachably interlocking all three legs into a rigid weight-supporting structure, said means being operable to detach said one leg from the other legs by swinging said one leg inwardly in a direction transverse to an imaginary line connecting the lowest extremities of said legs.

9. A disassemblable tripod supporting stand comprising three angularly spaced legs which incline upwardly and inwardly to merge into a centrally positioned elevated platform, one of said legs being detachably secured to the other two legs and having a gradually upwardly curved lower portion, a stepped intermediate portion, and a horizontally disposed upper portion which lies in a plane substantially parallel to said stepped portion, said intermediate and upper portions being joined by a substantially vertical section, an opening provided in said vertical section, said upper portion comprising a flat cross member having two spaced lugs depending therefrom, said other two legs having at the juncture thereof a downwardly offset ledge, the upper surface of said ledge being engageable by the lower surface of said cross member, and said lugs being engageable by said ledge to position same relative to said cross member, said lugs serving in detachably connecting said legs together into a rigid unitary structure which may be disassembled by pivoting said one leg about its connection with said other legs inwardly in a direction transverse to an imaginary line connecting the lower extremities of said other legs.

10. A disassemblable tripod supporting stand comprising three angularly spaced legs which incline upwardly and inwardly to merge into a centrally positioned elevated platform, one of said legs being detachably secured to the other two legs and having a gradually upwardly curved lower portion, a stepped intermediate portion, and a horizontally disposed upper portion, said intermediate and upper portions being joined by a substantially vertical section, an opening provided in said vertical section, said other two legs having at the juncture thereof a downwardly offset ledge, the upper surface of said ledge being engageable by the lower surface of said cross member, means cooperatively associated with said ledge and said lower surface for detachably interlocking said legs together into a rigid unitary structure.

References Cited in the file of this patent

UNITED STATES PATENTS

| Number | Name | Date |
|---|---|---|
| 1,114,411 | Stuver | Oct. 20, 1914 |
| 1,527,087 | Schulman | Feb. 17, 1925 |
| 1,538,609 | Barnett | May 19, 1925 |
| 2,210,047 | Stieglitz | Aug. 6, 1940 |
| 2,596,604 | Schaeffer | May 13, 1952 |